United States Patent Office 2,799,530
Patented July 16, 1957

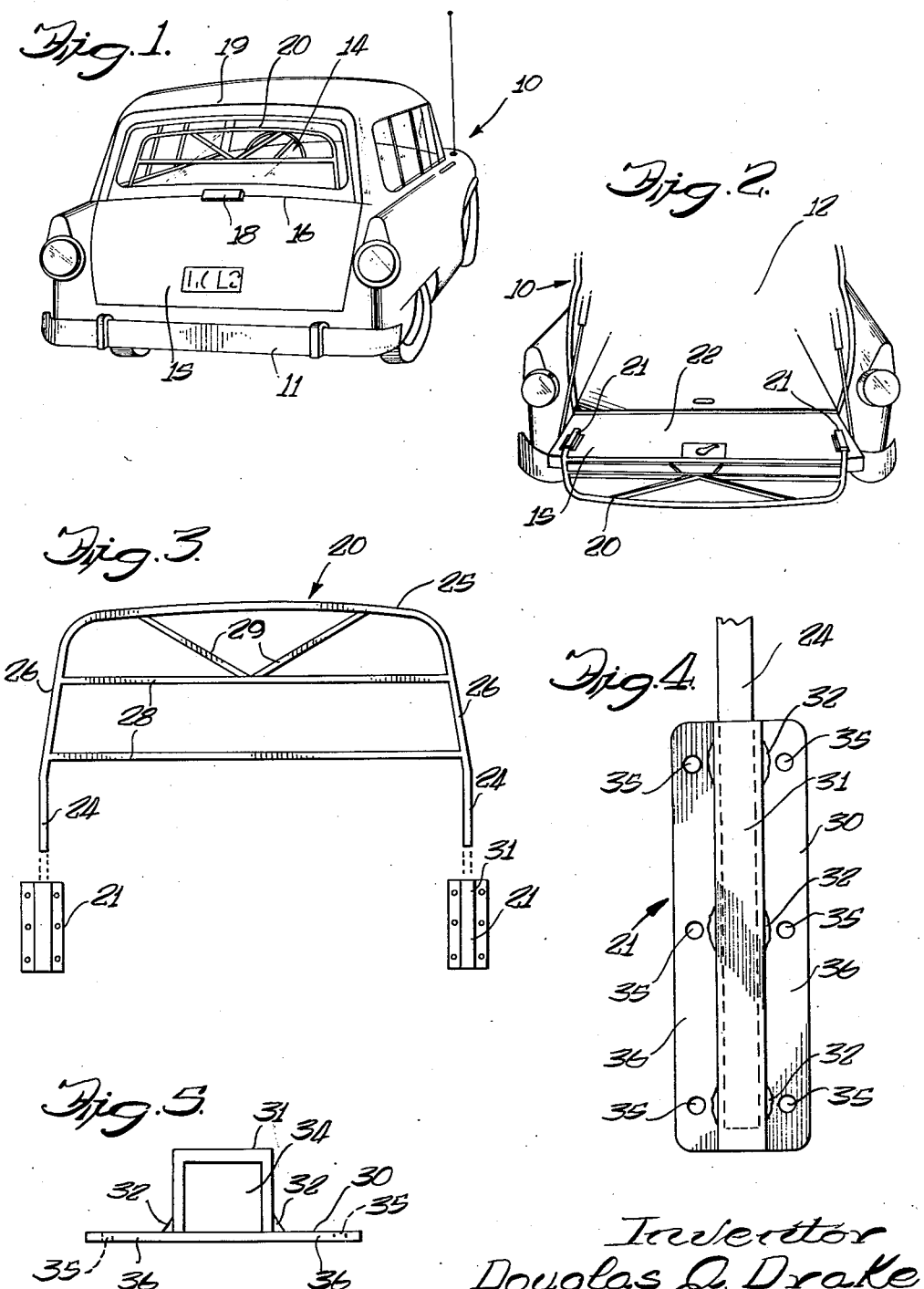

2,799,530

TAIL GATE GUARD

Douglas A. Drake, Belvidere, Ill.

Application January 11, 1956, Serial No. 558,474

3 Claims. (Cl. 296—106)

The present invention relates to the auto accessory field. In particular it relates to a rear window guard which may be employed when the rear window is opened for ventilation to prevent children, dogs, and the like from falling out of the opening.

The present trend in automobile chassis and body styles indicates an increasing use of that body style known as station wagon or "suburban." In this type of construction the rear portion of the vehicle presents a relatively vertical section, the upper half of which is an outwardly opened window and the bottom half of which is a downwardly folding gate or door. Such vehicles are finding extensive use in families where there are several children and a large passenger carrying capacity is desired. Also the rugged utility of these vehicles makes them highly desirable for use by sportsmen who often carry dogs to a hunting site.

Particularly in warm weather, it is found desirable to leave the rear window open so that the reduced pressure area behind the vehicle may be employed to facilitate rapid ventilation of the passenger portion of the vehicle. When small children, pets, and loosely packed light packages are being carried, it becomes highly desirable to place a guard across the window opening which will not impede the ventilation, but at the same time will prevent the children, pets, or packages from falling out the window opening.

With the foregoing in mind, it is the general object of the present invention to provide a removable rear window guard for a station wagon variety of automobile which is simple to install, and may be readily removed when not required.

Another object of the invention is to provide a simple and rugged rear window guard for station wagons which will withstand a substantial amount of abuse while at the same time being susceptible of inexpensive manufacture. A related object of the invention is to furnish a rear window guard for station wagons having a minimum of parts, and only a single removable part, so that when the unit is being stored out of use, the loss of small, but critical parts, will not preclude ready re-insertion of the guard.

Further objects and advantages of the invention will become apparent as following description of an illustrative embodiment of the invention proceeds taken in conjunction with the accompanying descriptive drawings in which:

Figure 1 is the perspective view of the rear portion of a station wagon type of automobile showing an illustrative window guard in place with the window in closed position.

Fig. 2 is a partial rear perspective view of the station wagon shown in Fig. 1 in which the tail gate has been lowered showing the assembled relationship between the rear window guard and the tail gate.

Fig. 3 is an exploded front elevation view of the principal elements of the rear window guard illustrating their intended assembled relationship.

Fig. 4 is a front elevation of a rear window guard mounting pocket showing the rear window guard inserted in the pocket.

Fig. 5 is a top view in enlarged scale of the rear window car mounting pocket shown in Fig. 4.

The environment in which the present invention is intended to be employed has been described generally above. Referring now to Figs. 1 and 2, it will be seen that a station wagon 10 has been shown, the rear portion 11 of which contemplates a tail gate opening 12 which is closed by a tail gate window 14 and a tail gate door 15. The tail gate window 14 and tail gate door 15 meet at a horizontal interface 16 and are normally secured at that point by a centrally disposed lock 18. The tail gate window 14 is pivotally hinged for opening about its upper edge 19 leaving an opening generally congruent with the shape of the tail gate window 14.

The operative and principal element of the tail gate window guard is the guard frame 20 which is mounted for positioning across the tail gate window opening. As will be better seen in Fig. 2, the tail gate guard frame is secured within a pair of mounting sockets 21 which in turn are secured to the inner face 22 of the tail gate door 15.

In operation, the car owner would purchase a pair of mounting sockets 21 and the guard frame 20 and mount the sockets 21 to the inner face 22 of the tail gate door 15, being careful to align the socket 21 so that the legs 24 of the guard frame 20 will slip in and out of the mounting sockets 21. When the window guard is to be inserted, the legs 24 of the guard frame 20 need only be aligned with guard socket 21 and slipped into place. When the tail gate 15 is raised into the traveling position (as shown in Fig. 1), the window guard frame 20 remains in place by the sheer force of gravity. In addition, the guard frame 20 is so proportioned that it cannot be removed by raising it upwardly when the tail gate is in the travel position, as it would then abut against the inside ceiling of the vehicle. By the same token, the tail gate guard may be readily removed by merely moving the tail gate door 15 from its travel position, as shown in Fig. 1, to the open position, as shown in Fig. 2. Then the tail gate window guard frame 20 is merely removed by withdrawing it from the mounting pockets 21.

In greater detail, the elements of the tail gate guard are shown in Figs. 3, 4, and 5. In Fig. 3, it will be seen that the tail gate guard frame 20 contemplates a single peripheral member 25 which is complementary in configuration to the tail gate window opening. Generally this configuration will be that of an isosceles trapezoid having two angled legs 26 and terminating in mounting legs 24, thereby defining a modified inverted U-shaped configuration. In the present instance, a pair of parallel crossbars 28 are joined at their ends to the downwardly diverting legs 26 of the peripheral frame 25. As shown in Fig. 3, diagonal brace bars 29 cover the open space between the upper cross bar 28 and the top of the peripheral frame 25. Although a wide variety of bar configurations may be employed, the present one has been found highly satisfactory. It is also contemplated, however, that heavy mesh wire and other media may be employed in the area defined by the tail gate guard frame 20 and the outwardly diverging legs 26.

The mounting pockets 21 are designed to cooperate with the mounting legs 24 of the tail gate guard frame 20. This relationship will be better understood by reference to Figs. 4 and 5. The mounting pocket 21 which has been shown contemplates a back plate 30 and U-shaped cooperating channel member 31, the channel member 31 being welded centrally along the longitudinal axis of the back plate 30. The channel 31 may be joined to the back plate 30 by welding, as shown at 32, or any other expedient fastening. The method of assembling the pocket elements is not critical to the invention, and other techniques such as extruding, or roll-forming the pocket 21 are contemplated. What is important, however, is that the pocket opening 34, as defined by channel member 31 (see particularly 5) will slidingly and snugly receive the mounting legs 24 of the tail gate window guard 20. A plurality of countersunk screw holes 35 are provided along the flanges 36 presented by the two sides of the back plate 30 which flank channel member 31. Self-tapping sheet metal screws proportioned to fit within the screw holes 35 are intended for use in fastening the mounting pocket to the inside face 22 of the tail gate door 15.

In review, it will be seen that three principal elements are contemplated, a pair of mounting sockets 21, and a guard frame 20. The relationship of the mounting legs 24 of the guard frame 20 with the socket 21 is that of a sheathing action, that is, the legs 24 fit within the pockets 34 defined by the mounting sockets 21. The unit may be readily installed in any vehicle with a minimum of time consumed. The guard may be removed or installed by the car owner in a matter of a few seconds. Once the guard has been mounted in place and the tail gate door 15 raised into the travel position, the guard cannot be removed until the tail gate door is again lowered, thus freeing the driver from worry about any passengers or parcels falling through the tail gate window opening.

Although particular embodiments of the invention have been shown and described in full here, there is no intention to thereby limit the invention to the details of such embodiments. On the contrary, the invention is to cover all modifications, alternative embodiments, usages and equivalents of the tail gate guard as fall within the spirit and scope of the invention, specification, and appended claims.

I claim as my invention:

1. A removable rear window guard for motor vehicles having a tailgate opening including an upper half window section and lower half door section meeting along a horizontal interface comprising, in combination, a pair of sockets, means on the sockets for securing the sockets to the inside portion of the tailgate door, and a single piece window guard frame characterized by a peripheral inverted U-shaped member modified in shape to complement the rear window opening, barring means within the area defined by the guard frame to block the window opening and yet permit ventilation, and a pair of legs terminating the bottom ends of the inverted U-shaped frame proportioned and alined with the sockets to permit axial insertion and removal of the guard from the sockets on the tailgate door.

2. A removable rear window guard for motor vehicles having a tailgate opening including window section hinged at its upper edge and lower half door section, the window and door sections meeting along a horizontal interface comprising, in combination, a pair of sockets, the sockets being characterized by a channel member secured to a back plate thereby defining a pocket and flanking mounting flanges for securing the sockets to the inside of the tailgate door, and a single piece window guard frame characterized by a peripheral inverted U-shaped member modified in shape to complement the rear window opening, barring means within the area defined by the guard frame to block the window opening and yet permit ventilation, and a pair of legs terminating the bottom ends of the inverted U-shaped frame proportioned and alined with the socket pockets to permit axial insertion and removal of the guard from the sockets in the tailgate door.

3. A removable rear window guard for motor vehicles having a tailgate opening including a window section and lower tailgate door section meeting along a horizontal axis comprising, in combination, a pair of sockets, means on the sockets for securing the sockets to the inside portion of the tailgate door section, and a single piece window guard frame characterized by a peripheral inverted U-shaped member modified in shape to complement the rear window opening, barring means within the area defined by the guard frame to block the window opening and yet permit ventilation, a pair of legs terminating the bottom ends of the inverted U-shaped frame proportioned and alined with the sockets to permit axial insertion and removal of the guard from the sockets on the tailgate door; the sockets, guard frame, and legs being oriented and proportioned to permit removal of the guard frame when the tailgate door is down and to prevent removal when the tailgate door is in the closed position.

References Cited in the file of this patent

UNITED STATES PATENTS

| 1,596,795 | Blakeney | Aug. 17, 1926 |
| 2,538,930 | Zammach | Jan. 23, 1951 |
| 2,603,529 | Troth et al. | July 15, 1952 |